No. 631,299. Patented Aug. 22, 1899.
A. GROUVELLE & E. BELOT.
MACHINE FOR MOLDING CIGAR BUNCHES.
(Application filed Sept. 11, 1896.)
(No Model.) 5 Sheets—Sheet 5.
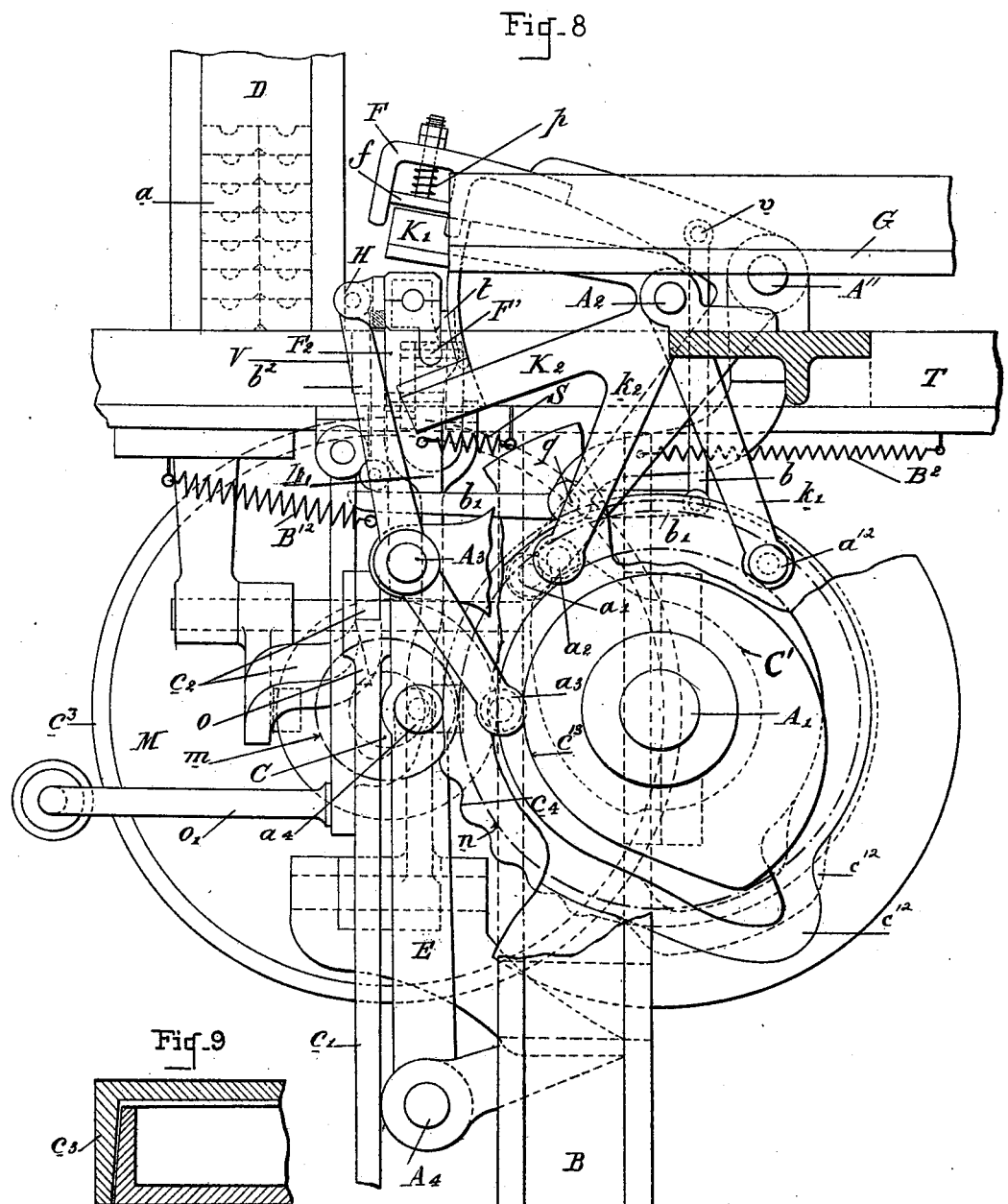

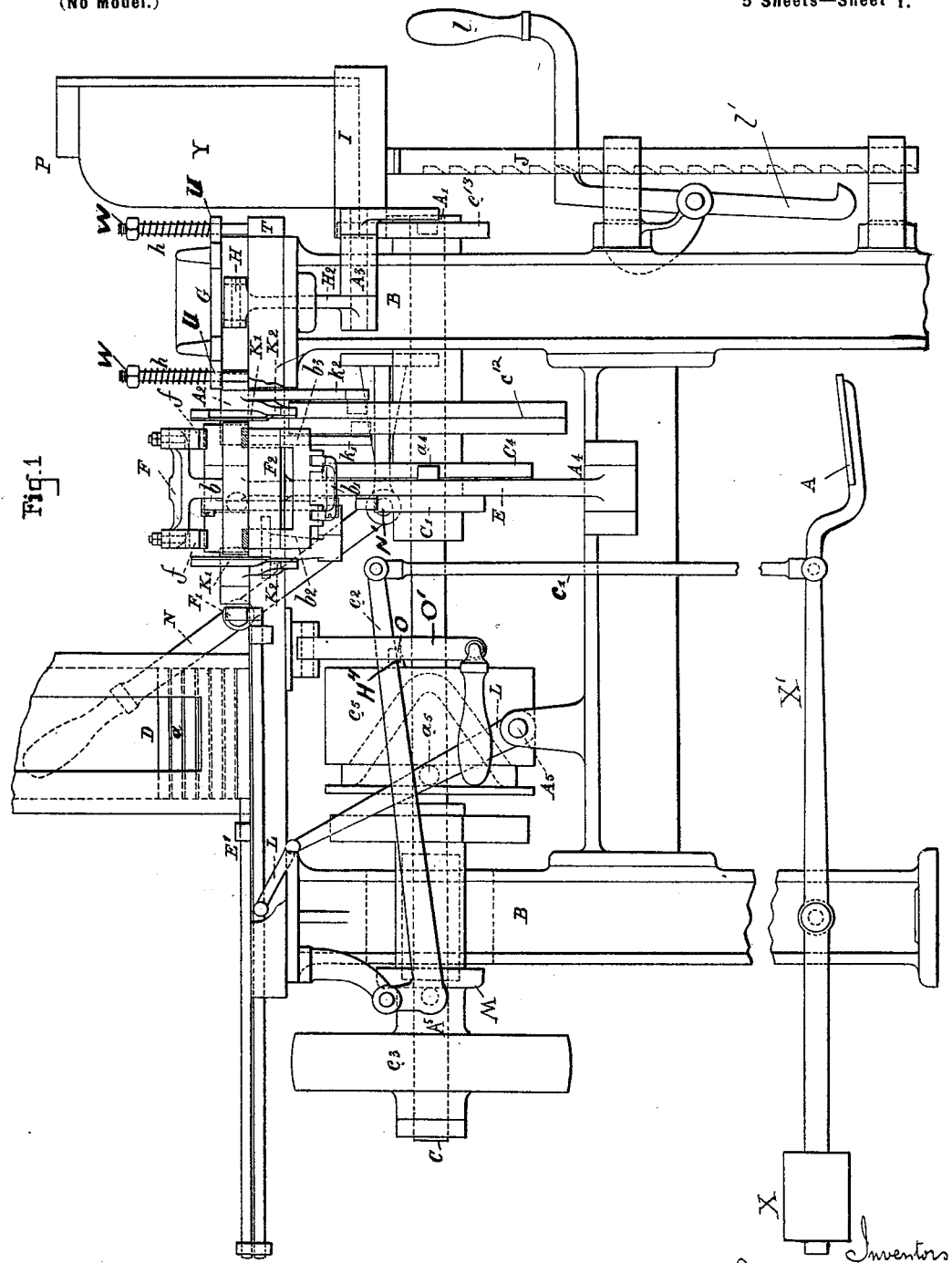

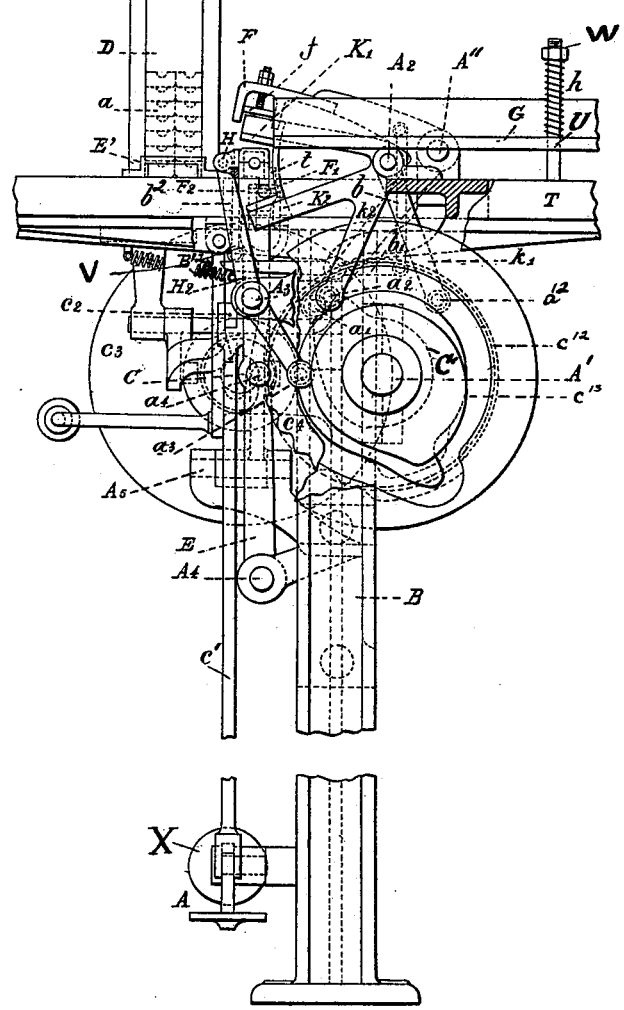

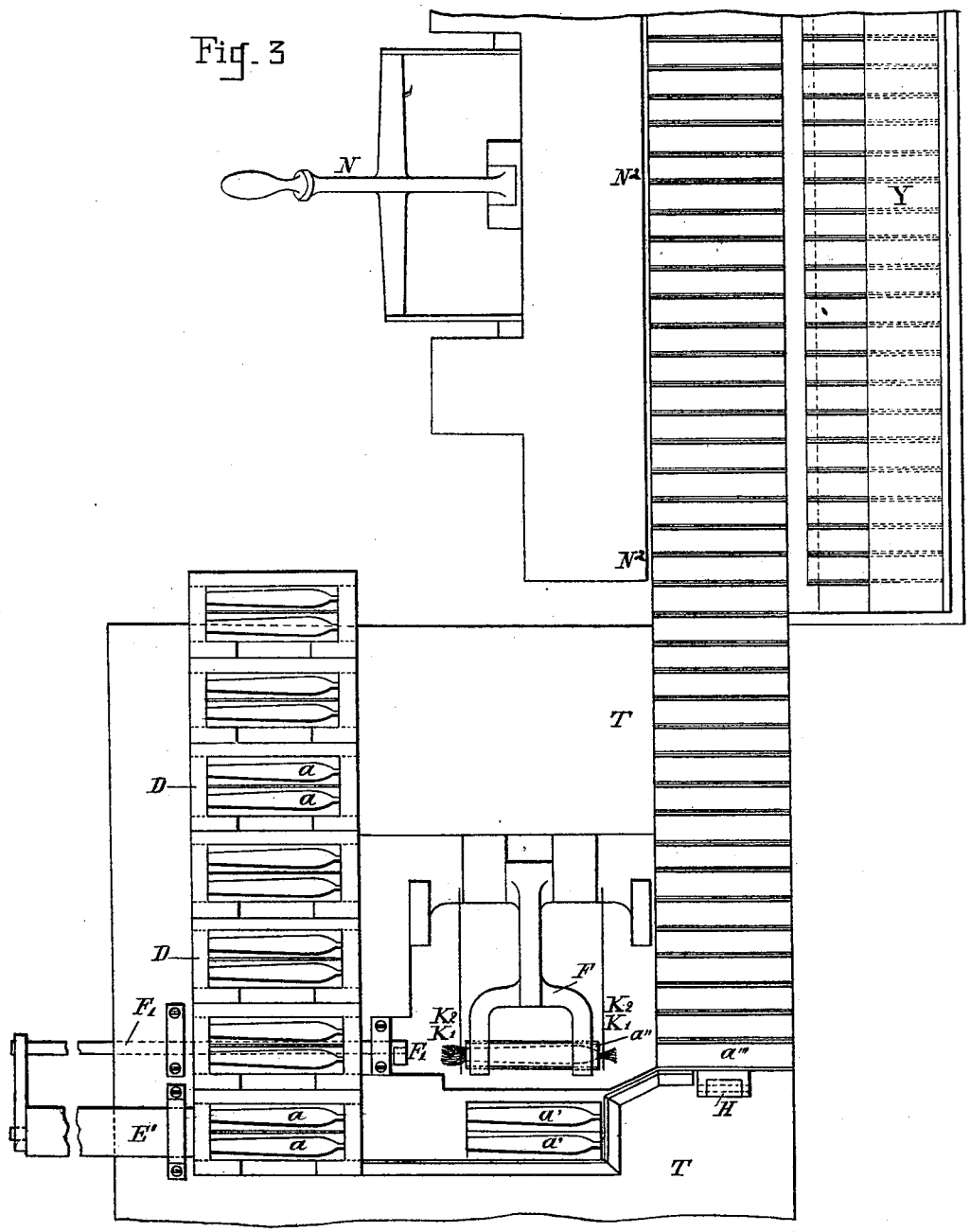

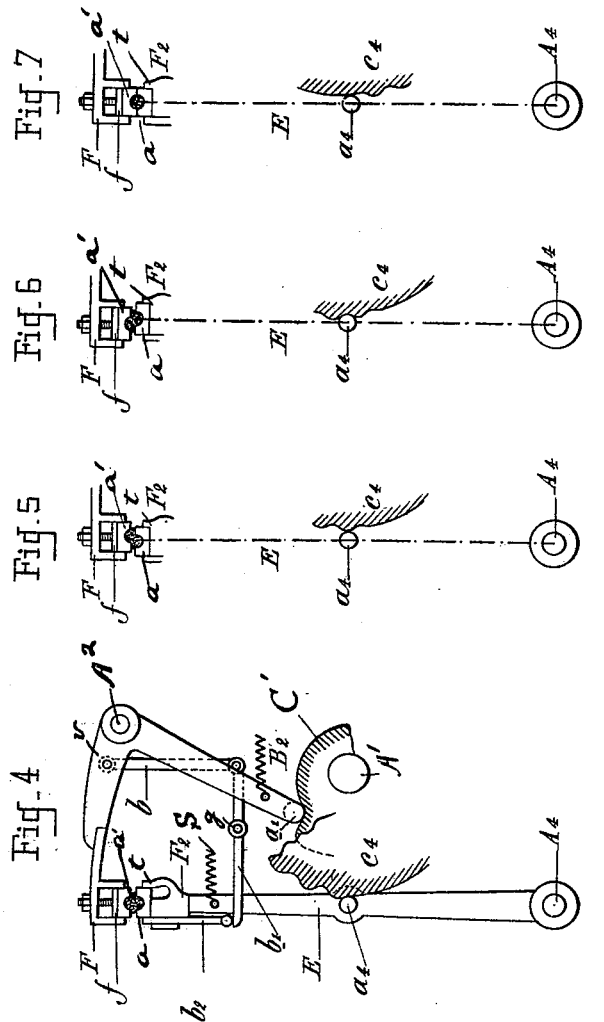

UNITED STATES PATENT OFFICE.

ANTOINE GROUVELLE AND EMILE BELOT, OF PARIS, FRANCE.

MACHINE FOR MOLDING CIGAR-BUNCHES.

SPECIFICATION forming part of Letters Patent No. 631,299, dated August 22, 1899.

Application filed September 11, 1896. Serial No. 605,493. (No model.)

*To all whom it may concern:*

Be it known that we, ANTOINE GROUVELLE and EMILE BELOT, citizens of the Republic of France, residing at Paris, in the Department of the Seine, France, have invented certain new and useful Improvements in Machines for Molding Cigar-Bunches, of which the following is a specification, this invention having been patented to us in France under date of March 20, 1896, No. 254,933; in Belgium under date of July 28, 1896, No. 122,738; in England under date of August 1, 1896, No. 17,083; in Germany under date of August 4, 1896, No. 95,717; in Italy under date of October 31, 1896, No. 84/178, and in Spain under date of November 21, 1896, No. 19,449.

The object of the invention is to provide a machine adapted to form the fillers or interiors of cigars of whole or scrap tobacco by means of separate molds acting to produce as perfect a result as that ordinarily accomplished by the use of block-molds.

A further object is to provide a machine wherein all the necessary actions shall as far as possible be performed automatically by the machine, thus avoiding all unnecessary handling of the mold-sections by the operators.

The invention consists in the construction hereinafter described, and set forth in the claims.

We have illustrated the invention in the accompanying drawings, in which—

Figure 1 is a front view of the machine. Fig. 2 is a side view taken from the right of Fig. 1 with the plates removed. Fig. 3 is a plan view. Fig. 4 is a partial side view illustrating the manner in which the mold which contains the bunch is held between the jaws. Figs. 5 and 6 are detail views showing different relative positions of the same jaws. Fig. 7 is a detail view of the same jaws in their middle position after the two half-molds have been put together. Fig. 8 is a partial side view showing on a larger scale than Fig. 1 the mechanism of the jaws, the scissors cutting the ends of the bunch, and the different parts which displace the mold in the machine. Fig. 9 is a partial section through the center of the friction-socket, which is part of the friction driving-gear of the machine.

Referring more particularly to the drawings, T is the table of the machine, which is supported by the legs or standards B B, and $c^3$ is the driving-wheel, mounted on the axle or shaft C.

A represents a pedal which is adapted to move the rod $c'$, and thus operate the lever $c^2$, which causes the inner cone M, Fig. 9, to enter the hub of the wheel $c^3$. The lever $c^2$ is maintained in its lower position by getting under the finger O of the lever O', thus holding the clutch-cone M in engagement with the cone-surface of wheel $c^3$ until a finger $H^4$, fixed to the side of the cam $c^5$, moves the lever O' aside, thus disengaging the lever $c^2$ from the finger O and permitting it to rise under the action of counterweight X, placed on the lever X', which carries the pedal A.

On the axle C is fixed a spur-wheel $m$, engaging a corresponding wheel $n$, fixed on shaft A', on which are secured the different cams which produce the various operations of the machine.

The half-molds to be operated upon are placed in one or more cases or hoppers D, (see Figs. 3 and 8,) which can be brought successively in front of the arm of a pusher E'. This pusher E' and a pusher F', arranged to move parallel therewith, are moved by a lever pivoted on the stationary pivot $A^5$ and operated by its roller $a^5$ engaging a cam-groove in the cam $c^5$, as shown in Fig. 1.

F is an upper jaw intended to hold the upper half-mold. The lower part $f$ of the jaw F is movable and extends sidewise through the side walls of the jaw F and is held down by the pressure of a helical spring $p$. The jaw F is carried by a lever which rocks on the axis $A^2$ under tension of the helical spring $B^2$, which holds the lever-roller $a'$ in contact with the cam C', secured on shaft A'. A rod $b$, attached at $v$ to the jaw F, imparts motion to a lever $b'$, which oscillates around the axis $g$, the lever $b'$ also giving an alternate vertical motion to the movable buttress $b^2$ of the lower jaw $F^2$. (See Fig. 4.) The lower jaw is carried by a lever E, rocking on axis $A^4$ and put into action by the roller $a^4$, which bears against a cam $c^4$ under the tension of a helical spring S, as shown in Fig. 4. The undulations of the cam $c^4$ impart to the jaw $F^2$ a series of alternate horizontal movements of slight amplitude, as represented in Figs. 5, 6, and 7. The jaw $F^2$ is grooved to correspond to the rod of the pusher $F'$, and its side $t$ is raised to serve as an abutment for the lower half-mold. Two grooved cams $c^{12}$ impart motion to the rollers $a'$ and $a^{12}$, carried by the bell-crank levers $k^2$ $k'$, rocking on the axis $A^2$, and these levers carry the scissors $K^2$ $K'$. A finger H is jointed on the arm of the bell-crank lever V, rocking on axis $A^3$, to which lever motion is imparted by a cam $c^{13}$ contacting with roller $a^3$ on the end of lever, this lever being under tension of spring $B^{12}$.

A heavy lid G covers the whole right side of the table above the molds and is guided vertically by standards W, passing through ears U. Helical springs $h$ serve to increase the action of the weight of the lid G. The lower horizontal surface of the lid G and the surface of the table T form a slideway, into which the filled molds slide.

A lever N, rocking on axis $N'$, imparts motion to a slide $N^2$, which extends for a distance equal to the width of twenty-five molds placed side by side.

Pigeonholes Y are arranged for the molds, these being placed on a vertically-movable plate I. (See Fig. 1.) The plate I is supported by an escapement-rack J and by means of the handle $l$ connected to rocking-lever $l'$, having a projection corresponding to the teeth of the rack. The plate I may be lowered by the rocking of said lever.

In the operation of the machine the half-molds are piled in pairs in one or more boxes D, one box being seen in Figs. 1 and 2 and a plurality of boxes in Fig. 3. When the half-molds have been removed from one box, the operator removes the empty box and places a full one in position. Each box is provided in its lower side with a cut-away portion, which permits the arm of the pusher $E'$ to pass through. The operator, seated in front of the jaws of the machine, takes from one side tobacco for the filler and from the other a leaf for the wrapper, in which wrapper the filler is placed without the exercise of particular care. The bunch thus formed is placed in one of the half-molds just delivered from the box D in the manner hereinafter more particularly explained and covered by the other half-mold, and the closed mold is then pushed into position between the jaws F $F^2$ of the machine. Simultaneously the operator presses the pedal A, which engages the friction-cone with the part M in the manner hereinbefore described, whereby the machine is set in motion, and the shaft $A'$, carrying the various cams, makes a complete rotation, the finger $H^4$ automatically effecting the disengagement of the cones and stoppage of the machine after one complete cycle of operations, as hereinbefore referred to. The machine thus set in motion lowers the jaw F at once upon a half-mold under the light pressure of spring-plate $f$, thus holding it securely in position. The lower half-mold, it will be observed, is held in position upon the lower jaw by the part $t$ on one side and the support $b^2$ on the other, which is raised through the action of lever $b'$ and rod $b$, which is connected at $v$ with the jaw F. The lower jaw $F^2$ is then given a slight horizontal reciprocating movement by the cam $c^4$, as indicated in Figs. 5, 6 and 7, while the jaw F continues to descend under the action of the spring $B^2$. The combination of this reciprocating motion of the lower half-mold with the progressive elastic pressure of the upper half-mold has the following effect: First, it causes the parts of the binder of the bunch, which might form a seam during the time when the half-molds are separated, to enter into the mold without injuring the binder, since the spring $p$ of plate $f$ will yield at once to the resistance of the bunch, thus preventing the molds getting too near each other, and, second, it renders uniform the packing of the filler after the resistance of the bunch has been overcome gradually through the action of the spring $B^2$ lowering the jaw F. The combination of these movements produces also a correct mold of the bunch. After this molding or forming process is finished the scissors $K'$ $K^2$, set in motion in the manner hereinbefore described, cut the bunch into the desired length by severing the portion projecting at each end of the mold. After the scissors have again separated the pusher $F'$ pushes the mold from the position indicated at $a''$, Fig. 3, where it is under pressure between the jaws, into the position indicated at $a'''$, where it is under the lid G, which keeps it under pressure. At the same time the pusher $E'$, which is parallel to the pusher $F'$ and which is put into action by the same mechanism, pushes before it the two half-molds which have fallen by their weight to the bottom of the box, moving them from position $a$ $a$ into position $a'$ $a'$, Fig. 3. After the pusher $E'$ has withdrawn from the box D the next two half-molds drop by gravity to the bottom of the box in position for the next action of pusher $E'$, and so on until all the molds in the box are used up, when a fresh box is placed in position, as before described. The filled molds having come into position $a'''$ under the lid G, they are gradually pushed rearward by the pusher or finger H, operated, as hereinbefore described, within the compartment formed between the lid G and the table T. In this movement the filled mold pushes before it all the preceding filled molds. The springs $h$, coacting with the weight of the lid G, keep the filled molds under pressure.

In order to rapidly transfer the molds from beneath the lid G into case Y, the lever N is operated from left to right, (see Figs. 1 and 3,) which moves the pusher-plate $N^2$ and carries a large number of the molds into the case Y. The handle $l$ is then operated to lower the case a corresponding amount. If desired, a weight P may be placed on the molds within the case to retain them under pressure.

Having now particularly described and ascertained the nature of our said invention and in what manner the same is to be performed, we declare that what we claim is—

1. In a cigar-bunch-molding machine, a pair of jaws for supporting the half-molds, means for causing said jaws to approach each other, and means for giving one of said jaws a lateral reciprocating motion relative to the other, substantially as described.

2. In combination, the support for the molds, means for bringing the molds from the support to within reach of the operator, the jaws for the mold-sections, means for causing the jaws to approach each other, means for giving to one a lateral reciprocating motion in relation to the other and means for discharging the molds from the jaws, substantially as described.

3. In combination, the jaws for receiving the two-part molds, means for causing them to approach each other, means for imparting to one a lateral reciprocating motion in relation to the other and the cutters for trimming off the tobacco projecting at each end of the mold, substantially as described.

In testimony whereof we have signed this specification in the presence of two subscribing witnesses.

ANTOINE GROUVELLE.
EMILE BELOT.

Witnesses:
   CLYDE SHROPSHIRE,
   JULES FAYOLUT.